US008287790B2

(12) United States Patent
Westerdahl et al.

(10) Patent No.: US 8,287,790 B2
(45) Date of Patent: Oct. 16, 2012

(54) METHOD FOR MANUFACTURING BEAMS OF FIBER-REINFORCED COMPOSITE MATERIAL

(75) Inventors: Anders Westerdahl, Linköping (SE); Ingemar Turesson, Linköping (SE); Jan-Erik Lindbäck, Linköping (SE); Mats Folkesson, Linköping (SE)

(73) Assignee: SAAB AB, Linköping (SE)

( * ) Notice: Subject to any disclaimer, the term of this patent is extended or adjusted under 35 U.S.C. 154(b) by 252 days.

(21) Appl. No.: 12/248,487

(22) Filed: Oct. 9, 2008

(65) Prior Publication Data

US 2009/0102092 A1    Apr. 23, 2009

(30) Foreign Application Priority Data

Oct. 9, 2007   (EP) .................................... 07118133

(51) Int. Cl.
*B29C 70/42* (2006.01)
(52) U.S. Cl. ...................................... 264/258
(58) Field of Classification Search .............. 264/258, 264/136, 137, 316
See application file for complete search history.

(56) References Cited

U.S. PATENT DOCUMENTS

| 3,177,105 A | 4/1965 | Wiltshire | |
| 3,967,996 A * | 7/1976 | Kamov et al. | 156/156 |
| 5,487,854 A | 1/1996 | Leoni | |
| 6,861,017 B1 * | 3/2005 | McCarville et al. | 264/39 |
| 2002/0071920 A1 * | 6/2002 | Obeshaw | 428/34.1 |
| 2004/0098852 A1 * | 5/2004 | Nelson | 29/428 |
| 2006/0083907 A1 | 4/2006 | Bech et al. | |

FOREIGN PATENT DOCUMENTS

| DE | 102005055050 A1 | 5/2007 |
| JP | 07080948 A | 3/1995 |
| WO | WO-2007/056973 A1 | 5/2007 |

OTHER PUBLICATIONS

European Search Report—April 24, 2008.

* cited by examiner

*Primary Examiner* — Christina Johnson
*Assistant Examiner* — Xue Liu
(74) *Attorney, Agent, or Firm* — Venable LLP; Eric J. Franklin

(57) ABSTRACT

A method for manufacturing a hollow load-bearing beam structure of fiber-reinforced composite material. The method includes preparing a first lay-up of a first plurality of layers, and a second lay-up of a second plurality of layers. The first and second lay-ups are positioned on different sides of a mandrel and formed to a beam structure by bending the lay-ups against the mandrel, such that the side edges of the respective layers of the first and second lay-ups are arranged as offset butt joints in the circumferential direction of the formed beam structure.

7 Claims, 4 Drawing Sheets

METHOD FOR MANUFACTURING BEAMS OF FIBER-REINFORCED COMPOSITE MATERIAL

CROSS-REFERENCE TO RELATED APPLICATIONS

This application claims priority to European patent application 07118133.3 filed 9 Oct. 2007.

TECHNICAL FIELD

The present invention relates to a method for manufacture of hollow load-bearing beam structures of fiber-reinforced composite material.

BACKGROUND ART

Load-bearing structures made of fiber composite materials exhibit advantageous strength to weight properties. A drawback of such structures is the relatively high production cost. These costs arise from the labour intensive and time consuming manufacturing process, which is associated with said structures.

The fibers of such composite structures, which fibers constitute the chief part of the load-bearing capability, are to be aligned in specific configuration in order to optimize the structures. Traditionally, this alignment has been made by winding the fibers around a mandrel or similar.

In modern manufacture, so-called prepreg has been used in order to speed the process up. Here, pre-impregnated mats of aligned fibers are used. The fiber mats can e.g. be impregnated in an epoxy resin, which resin thereafter is partially cured. The prepreg layers can manually or automatically, by means of a so-called tape layer, be applied onto a rigid or inflatable mandrel. Subsequently, the prepreg resin is cured by increasing the temperature and applying pressure. Generally, the pressure is applied by covering the layers with an outer membrane or by inflating the mandrel. A drawback of using an inflatable mandrel is that this procedure requires an outer female mould, which defines the outer shape of the product to be produced. On the other hand, a drawback associated with rigid mandrels is that the composite layers have a tendency to wrinkle under the applied pressure. Further, in known manufacturing methods, it is difficult to automatically, i.e. with a tape layer, accurately lay the prepreg layers up on the mandrel.

SUMMARY OF THE INVENTION

The objective of the present invention is to provide an improved method for manufacturing beams from laminated composite layers. By the method according to the invention, high strength beam structures can be manufactured in a more automatized process.

For this purpose the method of the present invention for manufacturing a hollow load-bearing structure of fiber-reinforced composite material, which load-bearing beam structure includes at least a first and a second plurality of laminated layers shaped by a rigid mandrel with an outer surface that corresponds to the inner surface of the load-bearing beam structure, comprises the steps of:

preparing a first lay-up of the first plurality of layers, one on top the other, with the respective side edges of the plurality of layers arranged offset with respect to each other, preparing a second lay-up of the second plurality of layers, one on top the other, with the respective side edges of the plurality of layers arranged offset with respect to each other, positioning the first lay-up on a first side of the rigid mandrel.

positioning the second lay-up on a second side of the rigid mandrel, forming the first and second lay-ups to the shape of the beam structure by bending the lay-ups against the mandrel, such that the side edges of the respective layers of the first and second lay-ups are arranged as offset butt joints in the circumferential direction of the formed beam structure, curing the beam structure, and removing the beam structure from the mandrel.

In particular, a high strength structure can be obtained by the circumferentially offset butt joints. This arrangement allows for a superior force transfer between adjacent layers.

The offset arrangement of the respective side edges of the plurality of layers can be achieved by sizing the first plurality of layers such that the width thereof gradually decreases from an inner layer to an outer layer, and by sizing the second plurality of layers such that the width thereof gradually increases from an inner layer to an outer layer. These layers are then positioned centrally with respect to one another. Or, alternatively, all the layers can be of the same width. These layers are then positioned with offsets in one width direction with respect to one another.

By laying up the layers of the lay-ups on a substantially flat supporting surface, the use of a tape-laying apparatus is facilitated. Thereby, the method enables a higher degree of automatization. Also, this ensures a more exact mutual positioning of the layers.

The step of positioning the first lay-up on the first side of the mandrel and a step of forming the first lay-up into the shape of a first portion of the beam structure on the mandrel can be carried out prior to forming the second lay-up into a second complementary portion of the beam structure on the mandrel. Thereby, the second lay-up can be accurately positioned with respect to the first lay-up.

In order to simplify the positioning of the second layers, the mandrel can be turned approximately 180° after the step of forming the first lay-up into the shape of the first portion of the beam structure and before the step of positioning the second lay-up on the mandrel.

The forming of the layers to the shape of the mandrel can be carried out by means of fluid pressure and an impervious membrane. Hereby, the layers are accurately formed and compressed in a desired manner. The compression entails evacuation of air from within the layers, and also ensures proper lamination of the layers. Further, fibers within the layers are appropriately aligned.

BRIEF DESCRIPTION OF THE DRAWINGS

By way of example, an embodiment of the present invention is illustrated in the enclosed schematic figures, where.

DETAILED DESCRIPTION

Below, an embodiment of the present invention is disclosed. The disclosure is not intended to limit the claimed scope of the present invention in any way.

Figure 1:
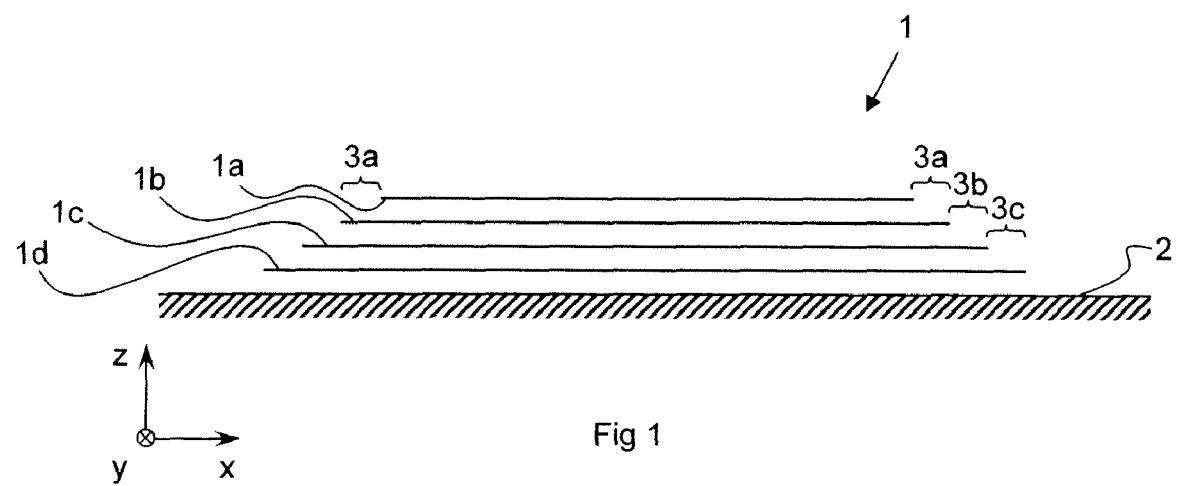
FIG. 1 shows a first step of a manufacturing process, where a first plurality of layers are laid up on a supporting surface.

In FIG. 1, a first plurality of layers 1 is laid up on a substantially flat supporting surface 2. This constitutes the initial step in the present method for manufacturing beam structures. The layer width (x-direction) of the layers 1 decreases in succession from bottom up, I.e., the lowermost inner layer 1d has the greatest width, and the uppermost outer layer 1a has the smallest width. As illustrated in the figure, the uppermost layer 1a is placed on the layer 1b below in a central manner, such that equal width differences 3a, 3a result at both ends of the layers 1a, 1b. Starting from the lowermost layer 1d, all successive layers 1c, 1b, 1a are arranged centrally with respect to the underlying layer 1d, 1c, 1b. In this example, four layers 1a, 1b, 1c, 1d are used. Thus, three width differences 3a, 3b, 3c are indicated.

The layers 1a-1d and the supporting 2 surface in FIG. 1 are shown in cross-section; the extension of the layers in the y-direction can be adjusted in accordance with prevailing circumstances.

In this embodiment, the layers 1a-1d consist of so-called prepreg, i.e. a fiber substrate impregnated in a semi-cured thermosetting epoxy resin composition. Since the layers 1 are laid up on a substantially flat supporting surface 2, an automatic tape laying apparatus can be used.

Figure 2:
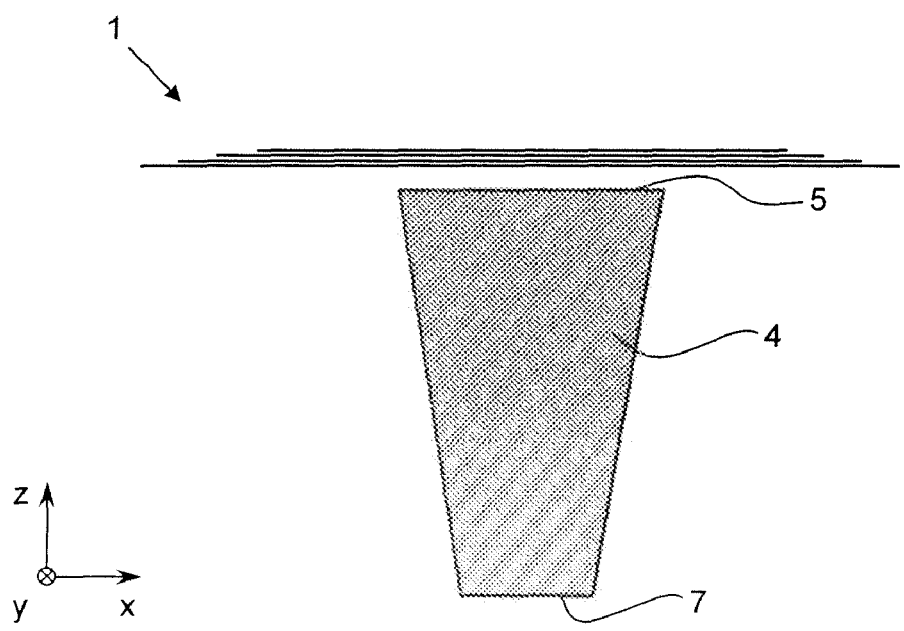
FIG. 2 illustrates how the layers are positioned on a mandrel.

FIG. 2 shows a mandrel 4 in cross-section. The outer surface of the mandrel 4 corresponds to the inner surface of the beam structure which is to be manufactured. Here the mandrel 4 is massive, although a hollow mandrel could also be used. A solid mandrel is more cost effective in manufacture, whereas a hollow mandrel requires less material and is easier to temperature regulate. In this second step of the manufacture method, the first plurality of layers 1 is placed on a first side 5 of the mandrel 4. In this embodiment, said first side 5 of the mandrel is the upper side of the mandrel.

The present mandrel 4, and thus the resulting beam structure 11, is of trapezoidal cross-section. The trapezoidal shape is suitable for manufacturing e.g. the core of control surface components for aircraft. Other cross-sections, e.g. circular, oval et cetera, are also conceivable. Further, with corresponding shape of the layers 1, 2, a mandrel cross-section that varies longitudinally (y-direction) can also be employed.

Figure 3:
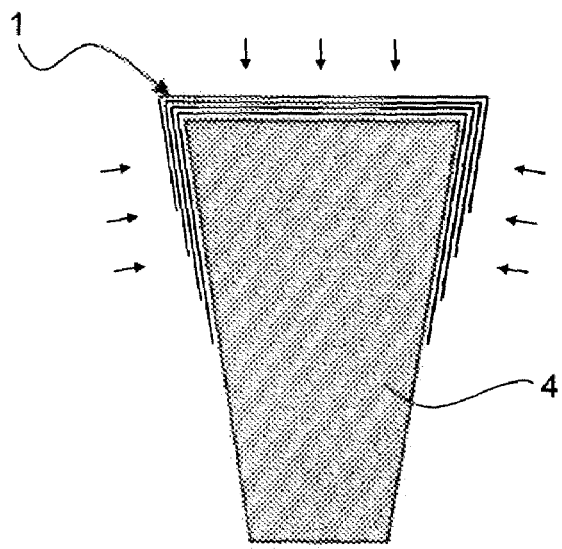
FIG. 3 illustrates the mandrel and the first plurality of layers after the layers have been shaped to the form of the mandrel.

Next, the lay-up 1 is shaped in accordance with the mandrel 4, as illustrated in FIG. 3. This procedure can be realized by applying an impervious membrane (not shown) onto the first plurality of layers (lay-up 1), and by means of fluid pressure forcing the membrane, and thus the layers 1a-1d, towards the mandrel 4. Said fluid can be either a liquid or a gas, and said pressure can be either an overpressure or an underpressure. An overpressure must be applied from the outside of the mandrel 4, as illustrated in FIG. 3, whereas an underpressure is to be applied from the inside of the mandrel 4, for example by a so called vacuum bagging technique. This forming step can be carried out under heating, which increases the formability of the layers 1a-1d.

Figure 4:
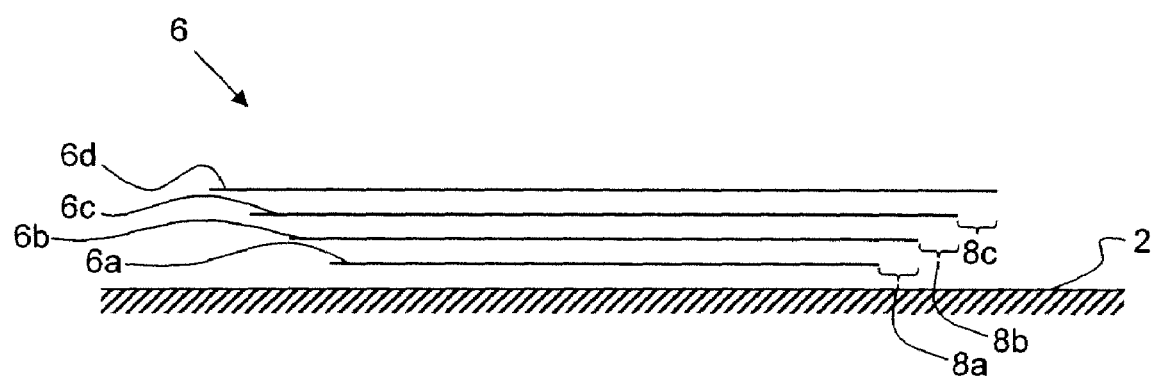
FIG. 4 shows how a second plurality of layers are laid up on a supporting surface.

FIG. 4 illustrates how a second plurality of layers 6 is laid up on a supporting surface 2. Compared to the arrangement of the first plurality of layers 1 in FIG. 1, the second plurality of layers is laid up in the reversed order. That is to say, the lowermost inner layer 6a has the smallest width and the uppermost layer 6d has the greatest width. The respective layer width differences 8a, 8b, 8c are equal on the left and the right side in FIG. 4.

In a step which is not shown, the second plurality of layers 6 is placed on a second side 7 of the mandrel 4. There, the second plurality of layers 6 is shaped in accordance with the mandrel 4, in a manner corresponding to the procedure described in connection with FIG. 3. The mandrel 4 can be turned upside down, or approximately 180°, before the second plurality of layers 6 is placed on the second side 7 of the mandrel 4. Such turning of the mandrel 4 facilitates the placing of the second plurality of layers 6 on the mandrel, since the second side 7 of the mandrel 4 is now the upper side of the mandrel. Alternatively, the second plurality of layers 6 are brought into contact with the mandrel from below. In this case, the mandrel 4 is not turned before the second plurality of layers 6 is applied. This can be accomplished by placing the second plurality of layers 6 on an impervious membrane (not shown) and lifting said membrane together with the second plurality of layers 6 up into contact with the mandrel 4. Said membrane can also be used for forming the layers to the shape of the mandrel. In this connection, the membrane can be placed on the supporting surface 2 before the layers 6a-6d are laid up, where after the layers 6a-6d are arranged on top of each other with the membrane acting as a supporting surface. Or the layers 6a-6d can be moved from the supporting surface 2 to the membrane before application onto the mandrel 4.

The first and second plurality of layers 16 can also essentially simultaneously be laid up on the supporting surface 2, before any of the layers 1, 6 are placed on the mandrel 4.

In accordance with the present embodiment, the first side 5 of the mandrel 4 is opposite to the second side 7 of the mandrel.

Figure 5:
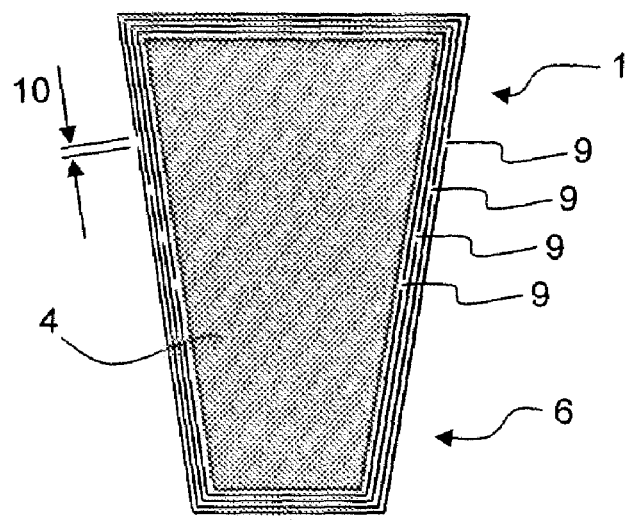
FIG. 5 illustrates the mandrel and the first and the second plurality of layers after the second plurality of layers have been shaped to the form of the mandrel.

FIG. 5 shows the mandrel 4 with both the first layers 1 and the second layers 6 applied and formed. Due to the width differences 3a-3c, 8a-8c of the first and second set of layers 1a-1d, 6a-6d, the respective layers meet at circumferentially offset butt joints 9. In each butt joint 9 there remains a gap 10 between the butting layers. In order to obtain the present arrangement of the layers 1, 6, the widths of the layers are adapted to the mandrel circumference. E.g., the sum of width of the innermost layer 1d of the first lay-up 1 and the width of the innermost layer 6d of the second lay-up 6 essentially equals the circumference of the mandrel 4. More precisely, the width of the two innermost layers 1d, 6d added by two joint gaps 10 equals the circumference of the mandrel 4.

While still positioned on the mandrel (FIG. 5), the layers 1, 6 are cured by heat treatment. In this matter, one mandrel 4 carrying two pluralities of layers 1, 6 can be cured separately, which results in a single discrete load-bearing structure 11. Or, alternatively, in order to form a more complex structure such as control surface components for aircraft, a plurality of mandrels can be brought together and group-cured as an assembly. Said assembly can be furnished with reinforcing elements and an outer embracing layer.

Upon curing, the layers 1a-1d, 6a-6d can be compressed, e.g. by means of a membrane and fluid pressure, in order to closely form the layers to the mandrel 4, and for improving the resulting beam quality by expelling air from the layers and aligning the prepreg fibers. Here, an autoclave can be used. The compression brings the respective ends of the first and second layers closer to one another, which reduces the butt joint gaps 10.

Figure 6:
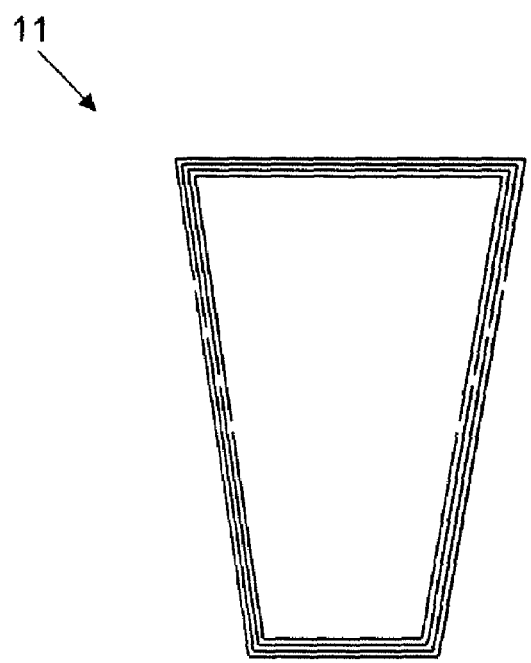
FIG. 6 shows a hollow beam structure

FIG. 6 illustrates a finished hollow load-bearing beam structure 11. Four offset butt joints 9 are shown on the left and right side, respectively. Here, all joint gaps 10 are of equal size.

The dimensions of the butt joint gaps 10, i.e. the width of the layers 1, 6, are optimized in accordance with prevailing circumstances. After manufacture, the butt joint gaps 10 serve no purpose. Thus, the gaps 10 are to be minimized. In this regard, the innermost butt joints 9, between the innermost layers 1d, 6d, can be of smaller dimensions than the outermost butt joints 9. If the layers 1a-1d, 6a-6d are compressed during curing, such compression will have a greater influence on the outer layers than on the inner layers, since the circumference reduction of the layers is cumulative. Any compression obtained on the inner layers will also influence the layers outside said inner layers. As a consequence, optimization of the butt joint gaps 10 can imply that the inner butt joint gaps, before compression, are of smaller dimension than the outer butt joint gaps.

Further, the width differences 3a-3c, 8a-8c can be adjusted depending on prepreg fiber and prepreg resin strength. The object of the width differences, which effect the offset arrangement of the butt joints 9, is to facilitate force transfer between the fibers of the respective layers to neighbouring layers. The longitudinal tensile stress of the fibers in an arbitrary layer is transferred to the fibers of an adjacent layer by shear stress in the resin, in which the fibers are impregnated. Thus, the butt joints 9 must be sufficiently offset to allow the inter-layer force transfer.

Figure 7:
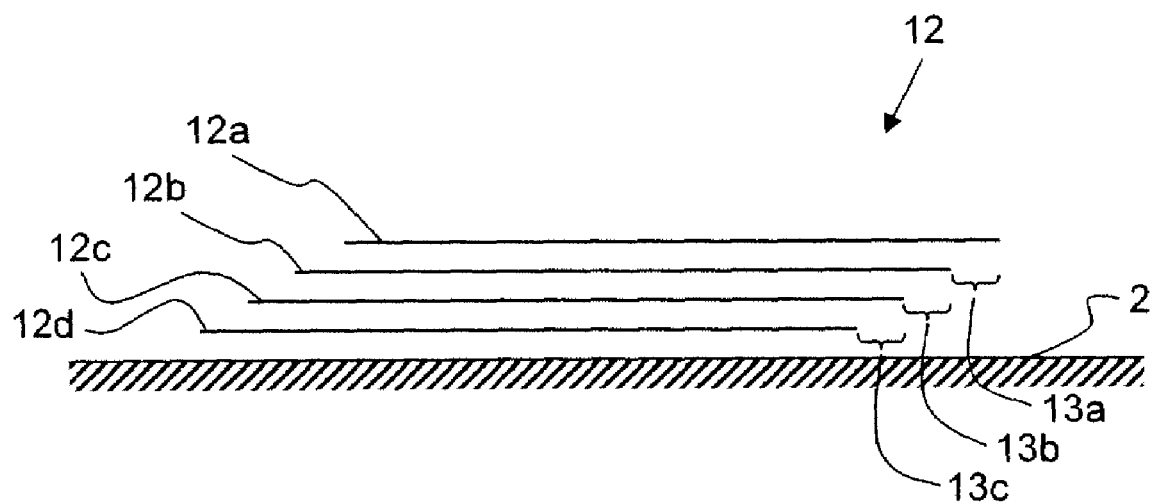
FIG. 7 shows an alternative lay-up for a plurality of layers on a supporting surface.

Above, a first and a second plurality of layers 1, 6 are formed around a mandrel 4 to two complementary shapes, which, joint together, constitute a hollow beam structure 11. However, the teachings of the invention do not exclude the forming and joining of several pluralities of layers into such hollow beam structures. In this regard, FIG. 7 shows an alternative lay-up 12. Here, all layers 12a-12d are of the same width. The layers are arranged with an offset 13a, 13b, 13c with respect to each other in one width direction. Now, the different lay-ups 1, 6, 12 can be arranged around a mandrel in a desired combination. Or, alternatively, several lay-ups 12 comprising layers 12a-12d of the same width can be used exclusively. Last mentioned lay-up 12 can also be used, especially for large hollow beam structures, as an extender between the lay-ups 1, 6 comprising layers of different width. Then, the lay-up 12 with layers 12a-12d of equal width must be arranged with offsets 13a, 13b, 13c that matches the width differences 3a-3c, 8a-8c of the lay-ups 1, 6 comprising layers of different width.

The invention claimed is:

1. A method for manufacturing a hollow load-bearing beam structure of fiber-reinforced composite material, wherein the load-bearing beam structure includes at least a first and a second plurality of laminated layers shaped by a rigid mandrel having an outer surface that corresponds to an inner surface of the load-bearing beam structure, the method comprising:
   preparing, on substantially flat supporting surface, a flat first lay-up of the first plurality of laminated layers, one on top of another, with respective side edges of the plurality of laminated layers arranged offset with respect to each other,
   preparing, on a substantially flat supporting surface, a flat second lay-up of the second plurality of laminated layers, one on top of another, with respective side edges of the plurality of laminated layers arranged offset with respect to each other,
   positioning a surface of the first lay-up on a first side of the rigid mandrel,
   positioning a surface of the second lay-up on a second side of the rigid mandrel,
   forming the first and second lay-ups to the shape of the beam structure by bending the lay-ups against sides of the mandrel adjacent the first and second sides of the mandrel, such that the offset side edges of respective laminated layers of the first and second lay-ups overlap and are arranged as offset butt joints in a circumferential direction around the formed beam structure,
   curing the beam structure after forming the first lay-up and second lay-ups to the shape of the beam structure, and
   removing the cured beam structure from the mandrel.

2. The method according to claim 1, wherein a width of the first plurality of laminated layers gradually decreases from an inner laminated layer to an outer laminated layer, and wherein a width of the second plurality of laminated layers gradually increases from an inner laminated layer to an outer laminated layer.

3. The method according to claim 1, wherein all laminated layers of the plurality of laminated layers have a same width.

4. The method according to claim 1, wherein the laminated layers are laid up with a tape laying apparatus.

5. The method according to claim 1, further comprising:
   forming the first lay-up into a shape of a first portion of the beam structure on the mandrel, wherein positioning the first lay-up on the first side of the mandrel and forming the first lay-up into the shape of the first portion of the beam structure on the mandrel are carried out prior to forming the second lay-up into a second complementary portion of the beam structure on the mandrel.

6. The method according to claim 5, wherein the mandrel is turned approximately 180° after forming the first lay-up into the shape of the first portion of the beam structure and before the step of positioning the second lay-up on the mandrel.

7. The method according to claim 1, further comprising:
   utilizing a vacuum bagging technique to form the lay-ups into a shape of complementary first and second portions of the beam structure on the mandrel.

\* \* \* \* \*